Nov. 4, 1924.
R. E. SAEGER
1,514,014
CAMERA ATTACHMENT
Filed May 5, 1923
2 Sheets-Sheet 1
Fig. 1.
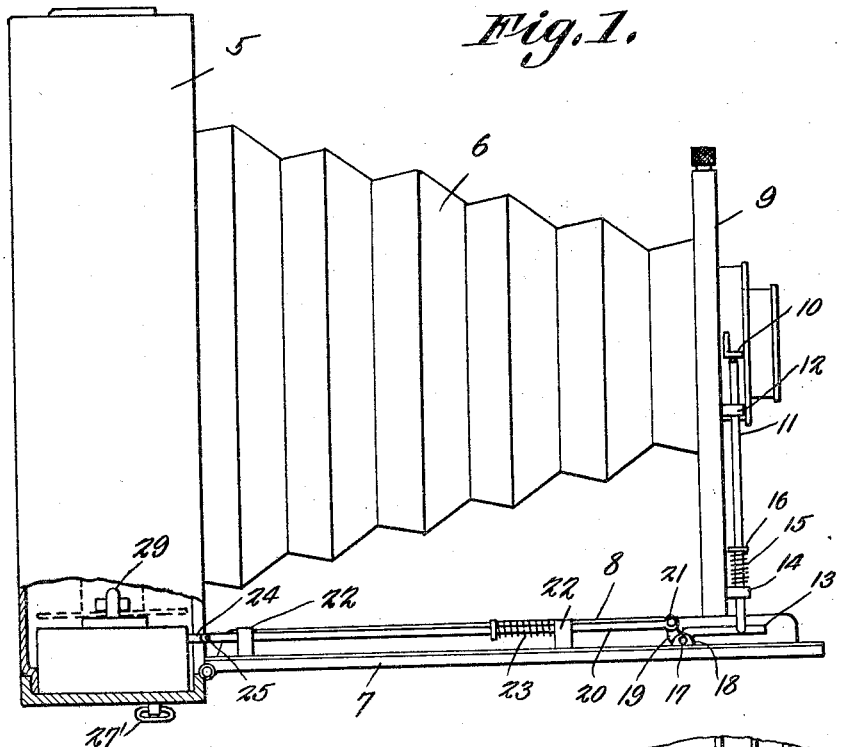
Fig. 3.
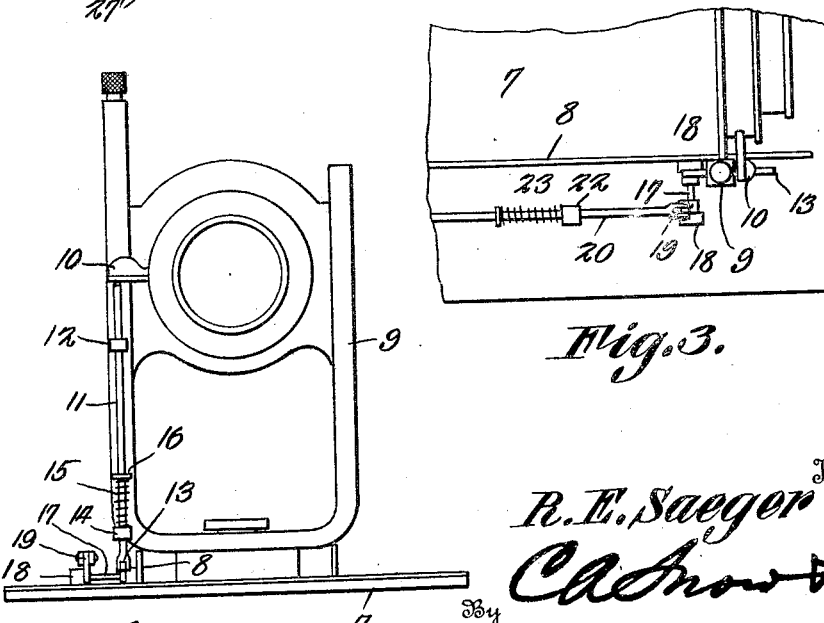
Fig. 2.
Inventor
R. E. Saeger
By C. A. Snow & Co.
Attorneys Nov. 4, 1924.  
R. E. SAEGER  
CAMERA ATTACHMENT  
Filed May 5, 1923

R. E. Saeger
Inventor

By C. A. Snow & Co.
Attorneys

Patented Nov. 4, 1924.

1,514,014

UNITED STATES PATENT OFFICE.

RALPH E. SAEGER, OF NAZARETH, PENNSYLVANIA.

CAMERA ATTACHMENT.

Application filed May 5, 1923. Serial No. 636,903.

*To all whom it may concern:*

Be it known that I, RALPH E. SAEGER, a citizen of the United States, residing at Nazareth, in the county of Northampton and State of Pennsylvania, have invented a new and useful Camera Attachment, of which the following is a specification.

This invention relates to camera attachments and more particularly cameras of the roll film type.

The primary object of the invention is to provide means to be actuated by the usual shutter control mechanism of a camera for automatically winding the film, when an exposure has been made, thereby eliminating the possibility of making a double exposure.

Another object of the invention is to eliminate the necessity of winding the film with the usual film winding key now in common use.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view of a camera, the lower portion thereof being broken away to illustrate the winding mechanism.

Figure 2 is a front elevational view of the controlling mechanism.

Figure 3 is a fragmental plan view thereof.

Figure 4:
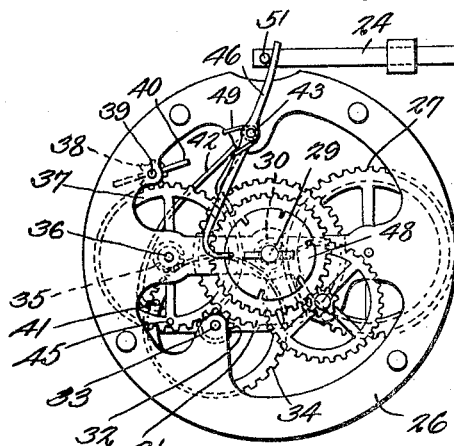
Figure 4 is a plan view of the winding mechanism.
Figure 5:
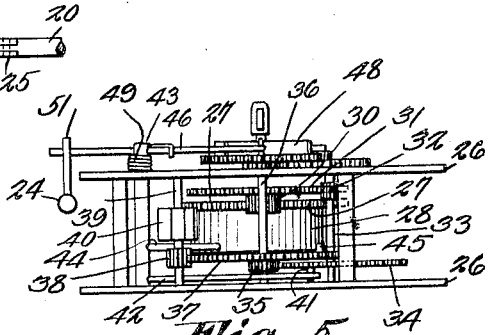
Figure 5 is a side elevational view thereof.
Figure 6:
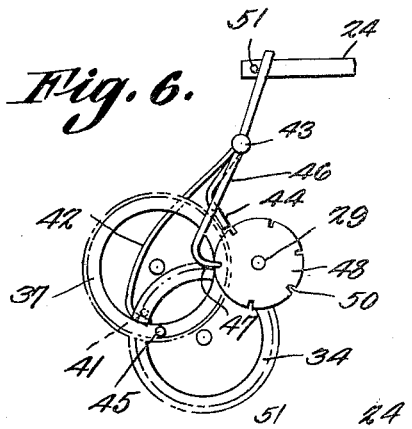
Figure 6 is a plan view of the controlling disk and gears associated therewith.
Figure 7:
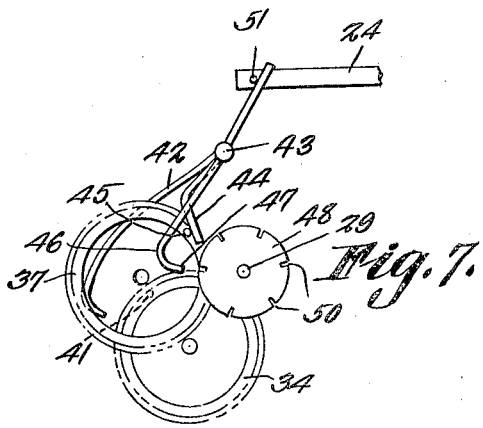
Figure 7 is a plan view disclosing the temporarily locking means for locking the winding mechanism against movement.
Figure 8:
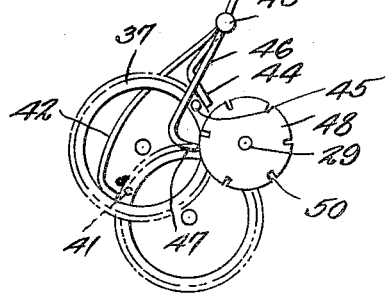
Figure 8 is a plan view disclosing the locking mechanism in its inactive position.

Referring to the drawings in detail, the camera is indicated generally by the reference character 5 and includes the usual bellows 6 and camera closure 7, the camera closure being supplied with the usual track section 8 on which the bellows and lense supporting member 9 moves.

The shutter controlling lever of the camera is indicated at 10 and is designed to contact with the vertical operating rod 11 that moves through the bearing 12, the lower end of the rod 11 being forked to straddle the arm 13 that is pivotally mounted on the inner surface of the camera closure 7.

A bearing 14 is also mounted on the member 9 and provides a rest for the lower end of the coiled spring 15, the upper end of the spring engaging the disk 16 so that the spring is placed under tension upon downward movement of the rod 11 which returns the rod 11 to its normal position when pressure on the shutter controlling lever is released by the operator.

The arm 13 is mounted on the shaft 17 that moves in the bearings 18, the arm 13 being offset to permit the forked end of the rod 11 to move onto the arm 13 when the camera has been opened and the bellows moved to properly focus the camera.

Supported on the rod 17 is an upwardly extended arm 19 to which the horizontal rod 20 has pivotal connection at 21, the rod operating in the bearings 22 and returned to its normal position by means of the coiled spring 23 that embraces a portion of the rod 20.

A relatively short arm 24 is pivotally connected to the rod 20 at 25 so that when the bellows has been moved to a position within the camera, the rod 20 may also fold upwardly with the closure 7.

A spring controlled motor which operates the supporting shaft of a film spool embodies spaced plates 26 between which is mounted gearing that includes the spring actuated gear 27 which may be operated by a suitable key 27' to wind the spring 28.

Vertically disposed between the members 26 is a shaft 29 on which the pinion 30 is mounted, which pinion is in mesh with the teeth of the gear 27 to rotate the shaft 29. Positioned above the pinion 30 is a gear 31 that meshes with the pinion 32 carried by the shaft 33, at the lower end of which is mounted a gear 34 meshing with pinion 35 that in turn is mounted on shaft 36 to rotate the same.

This shaft 36 supports a gear 37 that meshes with a pinion 38 mounted on the shaft 39 which has a governor 40 mounted thereon. Depending from the gear 34 is a pin 41 which is adapted to be engaged by the arm 42 carried by the shaft 43 to temporarily hold the gearing against movement.

Extending laterally from the shaft 43 is an arm 44 which is adapted to lie in the path of travel of the pin 45 carried by the gear 37 when the shaft 43 has been moved to a predetermined position to free the gearing, the arm 44 acting to retard the movement of the gearing for a predetermined interval.

Mounted on the upper extremity of shaft 43 is a controlling arm 46 formed with an inwardly extended relatively flat finger 47, at one end thereof, which finger is normally held into engagement with the periphery of the controlling disk 48 mounted on the shaft 29, by means of the coiled spring 49, which is coiled around the shaft 43 and has one end thereof contacting with the controlling arm 46.

Formed in the periphery of the disk 48 are notches 50 that are arranged in spaced relation with each other, the distances between the notches being varied to compensate for the increasing diameter of the spool on which the film is being wound, to insure the proper framing of the film in the camera. The distances between the notches are such as to permit a length of film to be wound on the usual film spool to expose a length of sensitive film before the lens for the taking of the next picture. When the arm 46 has been actuated to release the disk 48 to permit the winding of the film on the spool, the finger 47 which moves over the periphery of the disk 48 will fall into the adjacent notch, moving the shaft 43 to cause the arm 42 to contact with the pin 41 to stop the spring motor.

As shown, one end of the arm 46 lies in the path of travel of the pin 51 carried by the arm 24, whereupon as the arm 24 moves forwardly, the finger 47 is moved from its position within the notch 50 of the disk.

In the operation of the device, as the shutter controlling lever 10 is moved downwardly, to expose the film in the taking of a picture, the rod 11 is moved downwardly which in turn moves the arm 13 that causes the rod 20 to move longitudinally of the camera closure 7 with the result that the controlling arm 46 is moved to release the finger 47 from the notch in which the same is positioned. The spring of the motor now rotates the gearing until the pin 45 contacts with the arm 44 which prevents further movement of the film winding spool until the shutter controlling arm has been released and the rod 20 returned to its normal position, whereupon the gearing continues to rotate until the finger 47 falls opposite the adjacent notch whereupon the spring pressure forces the finger into the notch moving the shaft 43 which carries the arm 42 into engagement with the pin 41 to prevent the further operation of the spring motor.

Thus it will be seen that the controlling mechanism is such as to prevent the winding of the film until the shutter has been closed.

What I claim as new is:—

In a film winding device, a spring-controlled film supporting shaft, a disk having notches formed in the periphery thereof and adapted to rotate with the shaft, gears having laterally extended pins supported adjacent to the disk and adapted to rotate therewith, arms having fingers supported adjacent to the gears, one of the fingers adapted to normally lie in a notch of a disk to prevent rotation thereof, means for releasing the finger from the notch and simultaneously moving the fingers of the arms into the paths of travel of the pins to stop rotation of the gears after they have moved predetermined distances.

In testimony that I claim the foregoing as my own, I have hereto affixed my signature in the presence of two witnesses.

RALPH E. SAEGER.

Witnesses:
HARVEY P. DIETZ,
VICTOR E. WILLIAMSON.